(12) United States Patent
Kern

(10) Patent No.: US 8,010,776 B2
(45) Date of Patent: Aug. 30, 2011

(54) ADAPTIVE SYSTEM BOOT ACCELERATOR FOR COMPUTING SYSTEMS

(75) Inventor: William Kern, Palo Alto, CA (US)

(73) Assignee: Spansion LLC, Sunnyvale, CA (US)

( * ) Notice: Subject to any disclaimer, the term of this patent is extended or adjusted under 35 U.S.C. 154(b) by 887 days.

(21) Appl. No.: 11/957,793

(22) Filed: Dec. 17, 2007

(65) Prior Publication Data

US 2009/0158023 A1 Jun. 18, 2009

(51) Int. Cl.
*G06F 9/00* (2006.01)
(52) U.S. Cl. ............... 713/2; 713/1; 713/100; 711/113; 711/118
(58) Field of Classification Search .............. 713/1, 2, 713/100; 711/113, 118
See application file for complete search history.

(56) References Cited

U.S. PATENT DOCUMENTS

| RE40,092 E | * | 2/2008 | Kang | 713/2 |
| 7,401,190 B2 | * | 7/2008 | Beckert et al. | 711/159 |
| 2005/0063228 A1 | * | 3/2005 | Beckert et al. | 365/200 |
| 2006/0282654 A1 | * | 12/2006 | Veen et al. | 713/1 |
| 2008/0209198 A1 | * | 8/2008 | Majni et al. | 713/2 |

* cited by examiner

*Primary Examiner* — Abdelmoniem Elamin
(74) *Attorney, Agent, or Firm* — Turocy & Watson, LLP

(57) ABSTRACT

An acceleration mechanism for boot-up processing in a computing system is provided. The acceleration mechanism relies on recording most, if not all, of the read transactions, associated with requests and retrievals made during a boot-up and, in some aspects most, if not all, of the write transactions, associated with requests and stores made during a shutdown process. Prior to executing the boot-up process, data associated with the transactions is pre-fetched based on the recorded information and used to make the requests or information retrievals during the ensuing boot-up process. Additionally, since the mechanism of the present innovation provides for continual recording and the transaction data, the acceleration of the boot-up process can be adaptive even if hardware additions/changes or any other changes that affect the boot-up or shutdown process occur.

20 Claims, 10 Drawing Sheets

US 8,010,776 B2

ADAPTIVE SYSTEM BOOT ACCELERATOR FOR COMPUTING SYSTEMS

TECHNICAL FIELD

The subject innovation relates generally to computing systems and in particular to systems and methods for accelerating the system boot process based on recording read transactions from previous boot and, in some aspects, write transactions from previous shutdown processes and using the information related to these transactions in ensuing boot processes.

BACKGROUND

In computing, booting, otherwise referred to as booting up is a bootstrapping process that starts an operating system when a user turns on or otherwise powers up a computer system. A boot sequence is the set of operations the computer performs when it is switched on that loads the operating system.

Most computer systems can only execute code that is stored in the system's memory, either the non-volatile memory, such as ROM or the volatile memory, such as RAM. Modem operating systems are stored on hard disks, or occasionally on secondary devices, such as USB flash memory drives or other non-volatile storage devices. When a computer system is first powered on, it does not have an operating system in memory. Since the computer's hardware, alone cannot perform complex actions such as loading an operating system program from the hard disk the computer must rely special purpose program, commonly referred to as a bootstrap loader, bootstrap or boot loader.

In conventional computing systems, the process of loading the operating system begins with the Central Processing Unit (CPU) executing software stored in the ROM. For example, in a Personal Computer the BIOS (Basic Input/Output System) program. The CPU is designed to execute the BIOS after reset without and external assistance. The primary function of the BIOS is to identify and initiate component hardware, (such as hard drives and the like). This is to prepare the computer system so other programs, such as the bootloader, stored on various media can load, execute, and assume control of the computing system.

The BIOS runs from the non-volatile memory, such as flash memory, PROM, EEPROM or the like, when the computing system is powered on. The BIOS initializes several motherboard components and peripherals including, but not limited to, the clock generator, the processors and caches, the memory controller and Input/Output (I/O) controller, system memory, peripheral component interface devices, mass storage controllers, graphics controllers and various I/O controllers, such as keyboard, mouse and the like. Finally after initializing the various components, the BIOS loads the boot loader for the operating system from the boot sector and transfers control to the boot loader. In turn, the boot loader loads the kernel of the operating system into volatile memory, such as RAM to allow for faster processing.

The time that is required to boot the system, i.e., bring the system up to a running state, is proportional to the amount of time necessary to make requests and retrieve information. Thus, the more requests for information that are made during the boot process, the longer the user has to wait for the computing system to reach a running state. While many of the information requests and information retrievals that are made during a boot process are redundant requests/retrievals that occur each time a boot occurs, some of the requests/retrievals will deviate over time as components related to the computing system are added and/or changed.

Therefore a need exists to accelerate the boot process for the purpose of mitigating the latency that a user experiences in waiting for an operating system to load. The desired system and methods should be adaptive so as to provide for acceleration of the boot process in instances in which the requests/retrievals made during the boot-up change over time.

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

The disclosed subject matter relates to systems and/or methods that can provide for the accelerating the boot process in a computing system. The acceleration process is facilitated by recording most, and in some aspects all, of the read transactions, in terms of system addresses/locations and transfer lengths, that the computing system requests during boot-up and in some aspects most, and in some instances all, of the write transactions, in terms of system addresses/locations and transfer lengths, that the computing system requests during shutdown. In turn, the recorded transaction data is stored in a table and accessed during boot-up to determine the transaction data. Once the transitional information is determined, the data associated with the transactions is read and forwarded to a boot cache used by a secondary storage system to hold data (e.g., the components of the operating system), which is used during the current boot-up process. In this regard, the present innovation takes into account the fact that many of the requests/retrievals made during the boot-up process have a high probability of being redundant requests that are used each time the computing system boots-up or powers down. Thus, these requests/retrievals are made ahead of or in parallel with the boot-up process, referred to herein as "pre-fetching" the transactions into the cache, masking the latency needed to retrieve the information from the storage media during the boot-up, so that the overall boot-up process can be accelerated.

Additionally, while the present innovation relies on the fact that many of the requests and retrievals performed during boot-up have a higher probability of being the same requests and retrievals performed during previous operations, it also provides for adaptation so that changes to the boot-up process are continually recorded in parallel to the pre-fetched process, which takes place prior to or during the boot-up process.

In one aspect, a system for accelerating the boot-up process in a computing system is defined. The system includes an operating system and a boot loader operable for loading the operating system. The system additionally includes a boot transaction recorder operable to record boot-up processing read transactions that occur during execution of the boot loader and maintain the transactions in a boot accelerator table. The boot acceleration table may include the system address/location and the transfer length for each entry/transaction in the table. The system also includes a pre-fetch module operable for accessing, prior to boot-up or during boot-up, the boot acceleration table to retrieve read transactions associated with previous boot-up processes. The system additionally includes a boot cache operable for receiving data associated with the retrieved read transactions from the pre-fetch module. The boot loader executes one or more read transactions using the data associated with the retrieved read transactions in the boot cache.

In additional aspects, the system may include a shutdown transaction recorder operable to record shutdown processing write transactions that occur during shutdown execution and maintain the write transactions in the boot acceleration table. In this regard, the boot acceleration table may additionally include the system address/location and the transfer length for each entry/write transaction in the table and the pre-fetch module may further be operable for accessing the boot acceleration table to retrieve from the write transactions associated with the previous shutdown processes. In such aspects the boot cache may be further operable for receiving data associated with the retrieved contents of the write transactions from the pre-fetch module and the boot loader may be operable to execute one or more read transactions using the data associated with the retrieved write transactions in the boot cache.

According to some aspects of the system, the boot transaction recorder may be further operable to iteratively update the boot acceleration table based on the occurrence of boot-up processing read transactions for each boot-up process that the computing system undergoes and, in some aspects, occurrence of shutdown processing write transactions for each shutdown process that the computing system undergoes. In this regard the boot acceleration table is a dynamic table that reflects any changes to the boot-up process in terms of changes to the boot-up processing read transaction and, in some aspects, the shutdown process in terms of changes to the shutdown processing write transactions.

Additional aspects of the boot-up accelerator system may include boot acceleration table logic operable for logically determining which boot-up processing read transactions to include in the boot acceleration table and, in some aspects, which shutdown write transactions to include in the boot acceleration table. The determination may be made by comparing the read/write transactions currently in the table versus read/write transactions occurring in a current boot-up or shutdown process, determining the delta and adjusting the table accordingly. Additionally, the boot acceleration table logic may be operable to determine the frequency of boot-up processing read transactions and, in some aspects, shut down processing write transactions and delete table entries associated with those transactions determined to occur infrequently in the corresponding boot-up or shutdown process. In this regard, the boot acceleration table logic provides for the boot acceleration table to be dynamic in nature, changing according to changes encountered by the boot-up process and, in some aspects, changes encountered in the shutdown process. Additionally, by adding new entries to the table based on changes and eliminating those transactions that occur infrequently, the boot acceleration table logic allows the boot acceleration table to adapt over time. As such, the boot-up acceleration process is continually undergoing refinement to increase the efficiency of the boot-up process.

A further aspect of the invention is defined by an electronic device that includes the aforementioned system for accelerating the boot-up process in a computing system. The electronic device may include, but is not limited to, a computer, a cellular phone, a digital phone, a video device, a smart card, a personal digital assistant, a television, an electronic game, a digital camera, an electronic organizer, an audio player, an audio recorder, an electronic device associated with digital rights management, a Personal Computer Memory Card International Association (PCMCIA) card, a trusted platform module (TPM), an electronic control unit associated with a motor vehicle, a global positioning satellite (GPS) device, an electronic device associated with an airplane, an electronic device associated with an industrial control system, a Hardware Security Module (HSM), a set-top box, a secure memory device with computational capabilities, or an electronic device with at least one tamper-resistant chip.

A further aspect of the innovation is provided for by a method for accelerating the boot-up process in a computing system. The method includes recording boot-up processing read transactions in a boot acceleration table, receiving a boot-up command or an equivalent event; and accessing, in response to the boot-up command or equivalent event, the boot acceleration table to retrieve read transactions associated with previous boot-up processes. The method additionally includes obtaining data associated with the retrieved read transactions and executing one or more read transactions associated with a boot-up process using the data associated with the retrieved read transactions.

A further aspect of the method provides for recording shutdown processing write transactions in the boot acceleration table. In such aspects, accessing further includes accessing, in response to the shutdown command, the boot acceleration table to store write transactions associated with current shutdown processes.

In one aspect of the boot-up accelerator method, recording boot-up processing read transactions further includes iteratively updating the boot acceleration table based on the occurrence of boot-up processing read transactions for each boot-up process and, in some aspects, based on the occurrence of shut-down processing write transactions for each shutdown process. In this regard, the boot acceleration table is a dynamic table that reflects any changes to the boot-up process in terms of changes to the boot-up processing read transactions and, in some aspects, the shutdown process in terms of changes to the shutdown processing write transactions.

Another aspect of the boot-up accelerator method includes determining logically which boot-up processing read transactions and, in some aspects, shutdown processing write transactions, to include in the boot acceleration table based on a comparison between read transactions currently existing in the boot acceleration table and read transactions occurring in a current boot-up process and, in some aspects based on a comparison between write transactions currently existing in the boot acceleration table and write transactions occurring in a current shutdown process. In this regard, a delta is determined between the current table and the current boot-up process read transactions, and in another aspect, the shutdown process write transactions and changes to the table are made in accordance with the delta. In another aspect the method includes determining which entries in the boot acceleration table occur infrequently in the boot-process and, in some aspects the shutdown process and deleting those entries from the boot acceleration table which are determined to occur infrequently in the boot process and, in some aspects, the shutdown process. In this regard the method provides for dynamically updating the boot-up acceleration table based on changes to the boot-process and/or shutdown process and deleting transactions that have either been aged out or are no longer relevant to the boot-process and/or shutdown process. As such, the method provides for the acceleration process to adapt over time based on changes to the boot-process and, in some aspects, the shutdown process and, in doing so, increases the performance of the overall boot-up acceleration process.

As such, the present innovation provides an acceleration mechanism for boot-up processing in a computing system.

The present innovation relies on recording most, and in some aspects all, of the read transactions, in terms of system locations/address and transfer lengths, associated with requests and retrievals made during a boot-up process. In some aspects, in addition to recording the read transactions associated with previous boot processing, the write transactions associated with previous shutdown processing will also be recorded. Prior to executing the boot-up process or in parallel with the execution of the boot-up process, the recorded transactions are determined, information related to the recorded transactions is pre-fetched and used in lieu of waiting for the operating system to issue the requests or information retrievals for the current boot-up process. Additionally, since the mechanism of the present innovation provides for continual recording of the transaction data and determinations of infrequently used transactions, the acceleration of the boot-up process can be dynamic and adaptive to change in the event of hardware additions/changes to the system or any other changes that affect the boot-up process.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Figure 1:
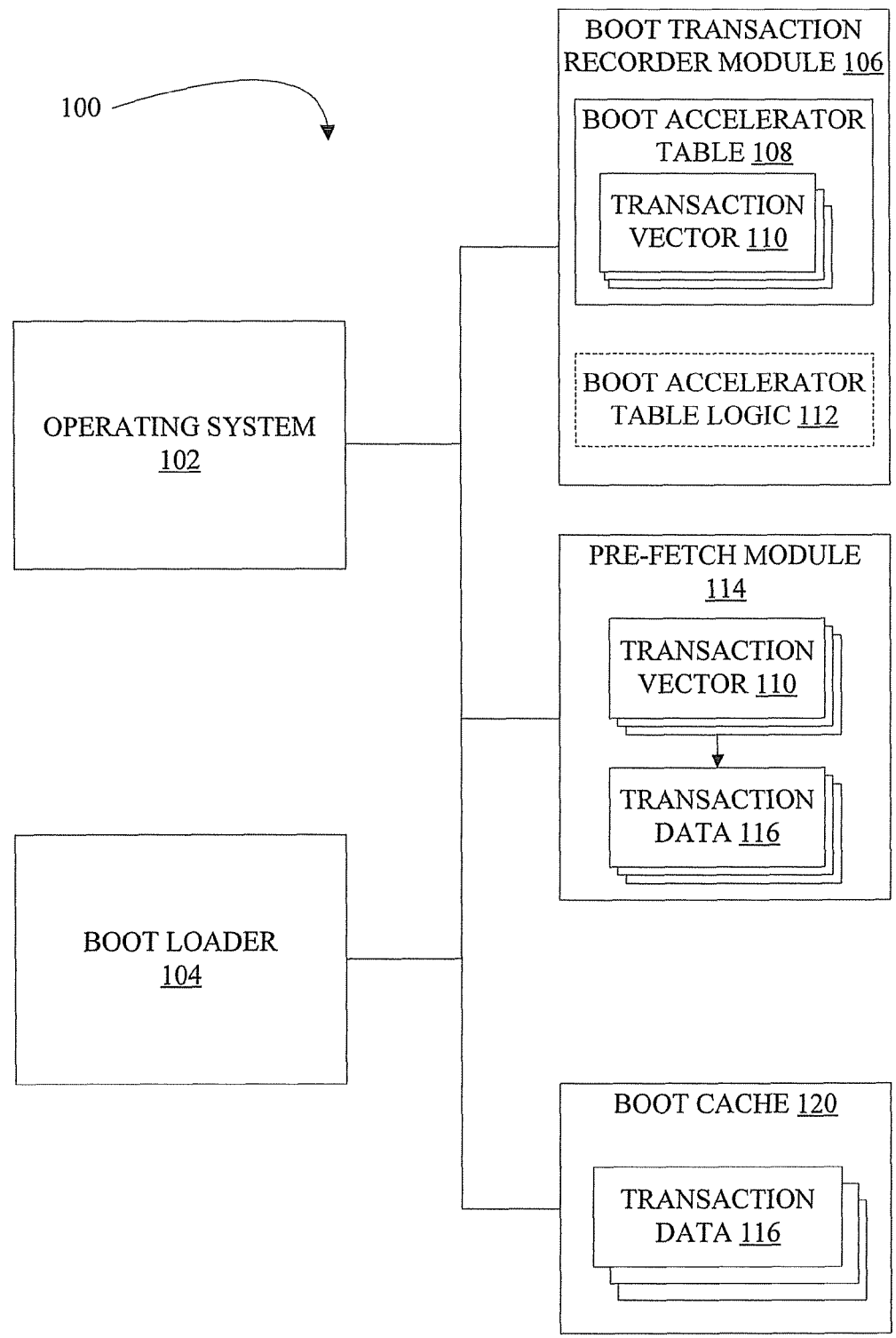
FIG. 1 illustrates a block diagram of a system for boot-up process acceleration in a computing system, in accordance with an aspect of the subject matter herein disclosed.

The disclosed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram form in order to facilitate describing the subject innovation.

In a computing system that utilizes an operating system, the boot-up process results in latency that lessens the overall user experience. The present innovation addresses this latency by providing boot process acceleration. The present innovation relies on the fact that many, if not most, of the read transactions that occur during a boot-up are redundant read transactions that occur each time the system boots-up. In addition, the present innovation takes into the account the fact that changes to the read transactions in the boot-up process will occur over time, due to hardware changes and the like, and thus, the systems and methods herein provided allow for the acceleration process to be dynamically adaptive based on these changes.

The boot-up acceleration system and method of the present innovation is facilitated by recording most, and in some aspects all, of the read transactions, in terms of system addresses/locations and transfer lengths, that the computing system requests during boot-up. In some aspects, the system may additionally record some, and in some aspects all, of the write transactions, in terms of system addresses/locations and transfer lengths, that the computing system requests during shutdown. In turn, these transactions are stored in a related table and the table is accessed just prior to or initially during the boot-up process to determine the previous transactions and to "pre-fetch" the data associated with the transactions. The data is then communicated to a boot cache that uses the data related to previous boot-up read transactions and, in some aspects, previous shutdown write transactions during the current boot-up process. This pre-fetching of data related to previous boot read transactions and, in some aspect, previous shutdown write transactions, allows the boot process to use the previous information without having to wait for the computing system to initiate redundant time-consuming read transactions during the boot-up process. It is assumed the access time for retrieving data from the cache is significantly less than the time required for the system to initiate requests that require the storage device to read the data from the media and write it to the cache before it is made available to the requesting system.

Turning to the figures, FIG. 1 illustrates a block diagram depiction of a system 100 for boot-up acceleration in a computing system. In the illustrated aspect of FIG. 1 the system is limited to basing boot acceleration on recorded read transactions associated with previous boot processes. The system includes an operating system 102, such as the Windows® operating system, available from Microsoft Incorporated of Seattle, Wash., the MAC OS®, available from Apple Corporation of Cupertino, Calif., the Linux operating system or the like. The system additionally includes a boot loader 104, which is operable for loading the operating system from the storage media, such as a hard disk, to the primary volatile storage, such as Random Access Memory (RAM) storage or the like. The boot loader makes numerous read transactions during the boot process to request data associated with loading the operating system. As previously noted, many of the read transactions that occur during the boot-up process are repetitive transactions that occur from the same system address locations each time the boot-up occurs.

The system 100 additionally includes a boot transaction recorder module 106 operable for recording the read transactions that occur during a boot-up sequence. In one aspect, the recorder module 106 records transaction vectors 110 that include the system address/location and the transfer length of the read transaction associated with the vector. The transaction vectors are recorded as entries in the boot acceleration table 108. The boot acceleration table 108 is typically stored in non-volatile memory, such as flash memory, EEPROM, PROM or the like.

The boot transaction recorder module 106 additionally may include optional boot acceleration table logic 112 that is operable to dynamically and adaptively makes changes to the boot acceleration table 108 based on changes in the read transactions requested by the boot loader 104. As such, the boot acceleration table logic 112 may be configured to compare the transaction vectors 110 currently residing in the boot acceleration table 108 to the read transactions occurring during a present boot-up process and make additions and/or deletions to the boot table 108, accordingly. For example, in one aspect, the boot acceleration table logic 112 will add a vector 110 to the table 108 for a new boot process read transaction, such as a read transaction related to the addition of new hardware, software or the like.

In another aspect, the boot acceleration table logic 112 may be operable to determine the currency of a transaction and delete those vectors 110 from the table 108 that are associated with read transactions no longer occurring or no longer consistently occurring during the read operation. For example, the logic may be configured to delete a vector 110 from the table, if the transaction has not occurred within a predetermined time period or within a predetermined number of boot-up processes. In addition, the boot transaction table logic 112 may be able to prioritize the read transactions in terms of relevancy to the boot-up process, so that vectors 110 related to read transactions that occur consistently in all boot processes are given priority in the table 108, such that they are not deleted from the table over time and/or are given priority in the pre-fetch process, which will be discussed in detail infra.

The system additionally includes a pre-fetch module 114 operable for fetching the transaction data 116 associated with a previous read transactions and providing the data 116 to the boot cache 120. The pre-fetch module will typically be executed prior to or during the initial start-up of the boot loader to insure that the data related to the previous boot operations is available for the boot-up sequence about to execute or beginning to execute. In one aspect, the pre-fetch module 114 is operable to sequentially access each vector 110 in the boot-up transaction table 108, issue a read command for each vector to obtain the transaction data 116 related to the vector 110 and communicate the transaction data to the boot cache 120.

Additionally, the system includes a boot cache 120 operable for receiving the transaction data 116 from the pre-fetch module 114. It should be noted that the boot cache 120 may be a general cache capable of storing other data and executing other functions throughout the computing system. If the boot cache 120 includes transaction data required by the a current boot-up process, the boot loader 104 will use the transaction data in the cache 120, as opposed to waiting for read operations it initiates to access the data. If the boot cache 120 does not include transaction data 116 for a required boot request/data retrieval, the boot cache will be required to issue the appropriate read command to retrieve the request information. The boot cache 120 may not include transaction data 116 for one of many reasons. For example, the boot cache 120 may not include transaction data 116 because the read transactions did not occur in previous boot-up processes, the pre-fetch for the transaction data was unsuccessful, the read transactions occur infrequently in the boot-process and therefore do not warrant inclusion in the boot transaction table 108 or the like.

Figure 2:
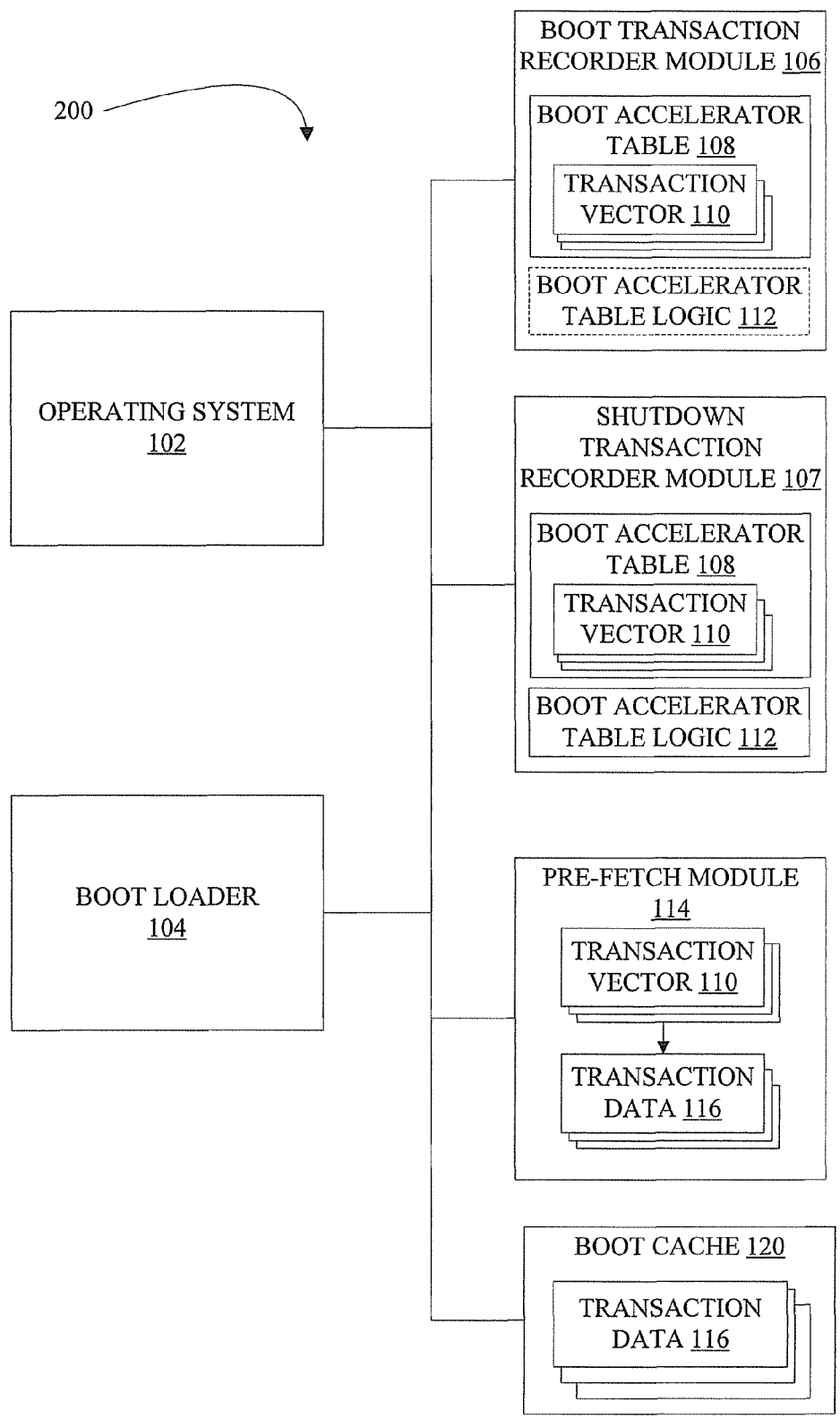
FIG. 2 illustrates a block diagram of an alternate system for boot-up process acceleration in a computing system, in accordance with an aspect of the subject matter herein disclosed.

FIG. 2 illustrates a block diagram depiction of an alternate system 200 for boot-up acceleration in a computing system, in accordance with an aspect of the present innovation. In the illustrated aspect of FIG. 2 the system bases boot acceleration on recorded read transactions associated with previous boot processes and recorded write operations associated with previous write operations. The system includes an operating system 102 and boot loader 104, which is operable for loading the operating system from the storage media, such as a hard disk, to the primary volatile storage, such as Random Access Memory (RAM) storage or the like. The boot loader makes numerous read transactions during the boot process to request data associated with loading the operating system. As previously noted, many of the read transactions that occur during the boot-up process and the write transactions that occur during the shutdown process are repetitive transactions that occur from or to the same system address location each time the boot-up or shutdown occurs.

The system 200 additionally includes a boot transaction recorder module 106 operable for recording the read transactions that occur during a boot-up sequence. In one aspect, the recorder module 106 records transaction vectors 110 that include the system address/location and the transfer length of the read transaction associated with the vector. The transaction vectors are recorded as entries in the boot acceleration table 108. The boot acceleration table 108 is typically stored in non-volatile memory, such as flash memory, EEPROM, PROM or the like.

The boot transaction recorder module 106 additionally may include optional boot acceleration table logic 112 that is operable to dynamically and adaptively make changes to the boot acceleration table 108 based on changes in the read transactions requested by the boot loader 104.

In the system 200 additionally include a shutdown transaction recorder module 107 operable for recording the write transactions that occur during a shutdown sequence. In one aspect, the recorder module 107 records transaction vectors 110 that include the system address/location and the transfer length of the write transaction associated with the vector. The transaction vectors are recorded as entries in the boot acceleration table 108. It should be noted that while boot transaction recorder module 106 and shutdown transaction recorder module 107 are depicted as separate entities, it is contemplated and possible for both recorder modules to exist in one comprehensive module/entity.

The shutdown transaction recorder module 107 additionally may include optional boot acceleration table logic 112 that is operable to dynamically and adaptively make changes to the boot acceleration table 108 based on changes in the write transactions occurring in shut processes. As such, the boot acceleration table logic 112 may be configured to compare the transaction vectors 110 currently residing in the boot acceleration table 108 to the write transactions occurring during a later shutdown process and make additions and/or deletions to the boot acceleration table 108, accordingly. For example, in one aspect, the boot acceleration table logic 112 will add a vector 110 to the table 108 for a new shutdown process write transaction, such as a write transaction related to the addition of new hardware, software or the like.

In another aspect, the boot acceleration table logic 112 of shutdown transaction recorder module 107 may be operable to determine the currency of a transaction and delete those vectors 110 from the table 108 that are associated with write transactions no longer occurring or no longer consistently occurring during the shutdown operation. For example, the logic may be configured to delete a vector 110 from the table, if the write transaction has not occurred within a predetermined time period or within a predetermined number of shutdown processes. In addition, the boot acceleration table logic 112 may be able to prioritize the write transactions in terms of relevancy to the boot-up process, so that vectors 110 related to write transactions that occur consistently in most, if not all, boot processes are given priority in the table 108, such that they are not deleted from the table over time and/or are given priority in the pre-fetch process, which will be discussed in detail infa.

The system additionally includes a pre-fetch module 114 operable for fetching the transaction data 116 associated with a previous boot read transactions and previous shutdown write transactions and providing the data 116 to the boot cache 120. The pre-fetch module will typically be executed prior to or during the initial start-up of the boot loader to insure that the data related to the previous boot-operations and previous shutdown operations, is available for the boot-up sequence about to execute or beginning to execute. In one aspect, the pre-fetch module 114 is operable to sequentially access each vector 110 in the boot-up transaction table 108, issue a read command for each vector to obtain the transaction data 116 related to the vector 110 and communicate the transaction data to the boot cache 120.

Additionally, the system includes a boot cache 120 operable for receiving the transaction data 116 from the pre-fetch module 114. It should be noted that the boot cache 120 may be a general cache capable of storing other data and executing other functions throughout the computing system. If the boot cache 120 includes transaction data required by the a current boot-up process, the boot loader 104 will use the transaction data in the cache 120, as opposed to waiting for boot loader initiated read operations to access the data. If the boot cache 120 does not include transaction data 116 for a required boot request/data retrieval, the boot cache will be required to issue the appropriate read command to retrieve the requested information. The boot cache 120 may not include transaction data 116 for one of many reasons. For example, the boot cache 120 may not include transaction data 116 because the read transactions did not occur in previous boot-up processes, the pre-fetch for the transaction data was unsuccessful, the read transactions occur infrequently in the boot-process and therefore do not warrant inclusion in the boot acceleration table 108 or the like.

It is to be appreciated and understood that, while system 100 and 200 are depicted with numerous modules, memory components and logic components, the subject innovation is not so limited, and the subject innovation can contain less than the modules, memory components and logic components shown, the same modules, memory components and logic components as shown, or more modules, memory components and logic components than are shown, as desired.

FIGS. 3-7 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 3:
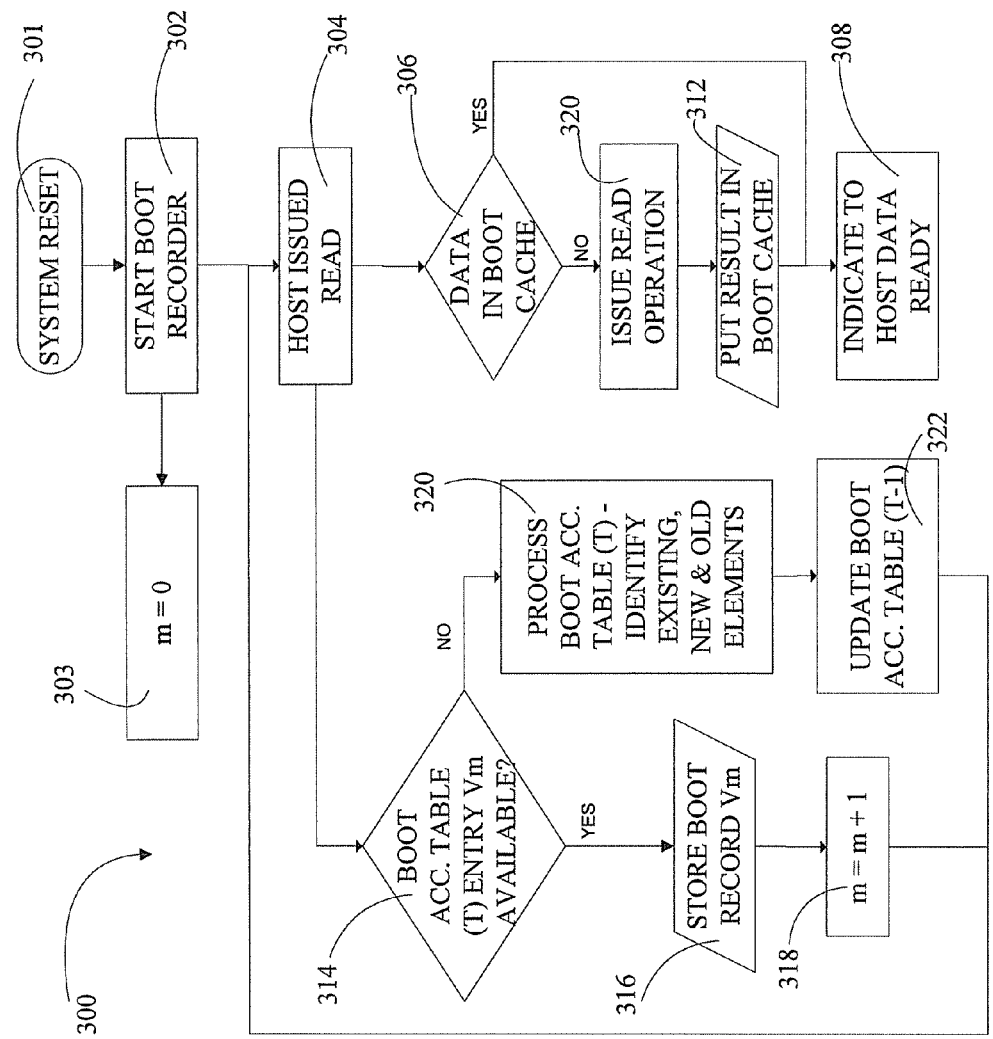
FIG. 3 illustrates a flow diagram of a methodology for recording read transactions in a boot-up process and executing the boot-up using information from previous boot-up read transactions, in accordance with an aspect of the current innovation.

Turning to FIG. 3, illustrated is a methodology 300 for recording read transactions associated with a boot-up process and performing a boot-up using transaction data associated with previous boot-process read transactions, according to aspects of the present innovation. At Event 301, the system powers-up or resets to initiate the boot loader (104) process. At Event 302, the boot recorder (106) is started to begin recording all of the read transactions occurring within the boot-up process. At Event 303, the counter associated with the boot recorder sets the initial index counter to zero to indicate that boot recording session is initiating.

At Event 304, the boot loader (104) issues a read transaction to begin the process of reading the operating system from the data store. The read transaction will trigger two events, the recording of the read transaction in the boot acceleration table (108) and the request for information associated with the issued read. Before a read command is sent, at Decision Block 306, a determination is made as to whether the data associated with the read transaction is currently available in the boot cache (120). As previously noted and discussed in detail in relation to FIG. 5, infra, a pre-fetch process will retrieve data associated with previous boot process read transactions and communicate the transaction data to the boot cache. The pre-fetch may occur before or, in many instances, in parallel with the current boot-up process, so that while transaction data is being pre-fetched for an upcoming read transaction another read transaction is occurring within the boot loader operation. the data associated with the read transaction is currently available in the boot cache (120). As previously noted and discussed in detail in relation to FIG. 5, infra., a pre-fetch process will retrieve data associated with previous boot process read transactions and communicate the transaction data to the boot cache. The pre-fetch may occur before or, in many instances, in parallel with the current boot-up process, so that while transaction data is being pre-fetched for an upcoming read transaction another read transaction is occurring within the boot loader operation.

If the transaction data associated with the requested read transaction does currently reside in the boot cache (120), the process will proceed to Event 308, where an indication is provided to the boot loader that the data is available. If the transaction data associated with the requested read transaction does not currently reside in the boot cache (120), at Event 320, the command for the requested read transaction is issued and the data associated with the read transaction is retrieved for the appropriate data store. Once the data has been retrieved, at Event 312, the data is placed in the boot cache (120) and, at Event 308, an indication is provided to the boot loader that the data is available.

In terms of recording the read transaction, at Decision Block 314, a determination is made as to whether an entry is available in the boot acceleration table (108). If it is determined that space is available, at Event 316, the entry for the transaction is written into the boot acceleration table (108), typically in the form of a transaction vector that may include the system address/location and the transfer length of the requested data. Once the data is written into the boot acceleration table (108), at Event 318, an index counter is incremented to indicate that an entry has been recorded in the table and the process returns to Event 304, where the next read transaction associated with boot process ensues.

If, at Event 314, a determination is made that no location/entry is available in the boot acceleration table (108), at Event 320, the boot acceleration table logic (112) is processed to identify an entry/transaction vector (110) in the table suitable for deletion. An entry/transaction vector (110) suitable for deletion may include a duplicate entry associated with one specific read transaction, an entry associated with a read transaction that is no longer occurring in the boot process, an entry associated with an infrequently occurring read transaction or the like. In this regard, the boot acceleration table logic (112) is able to dynamically adapt to the current state of the boot process and identify those read transactions in the boot process that are still relevant and, thus, require pre-fetching of the transaction data associated with the system address/location. Once the boot acceleration table logic (112) has logically determined a suitable entry for deletion, at Event 322 the entry is cleared from the boot acceleration table (108) and the new entry/transaction vector (110) associated with the current read transaction is entered into the boot acceleration table (108). The updating of the boot acceleration table (108) signifies the completion of the recording process and the process will return to Event 304, where the next read transaction associated with boot process ensues.

Figure 3A:
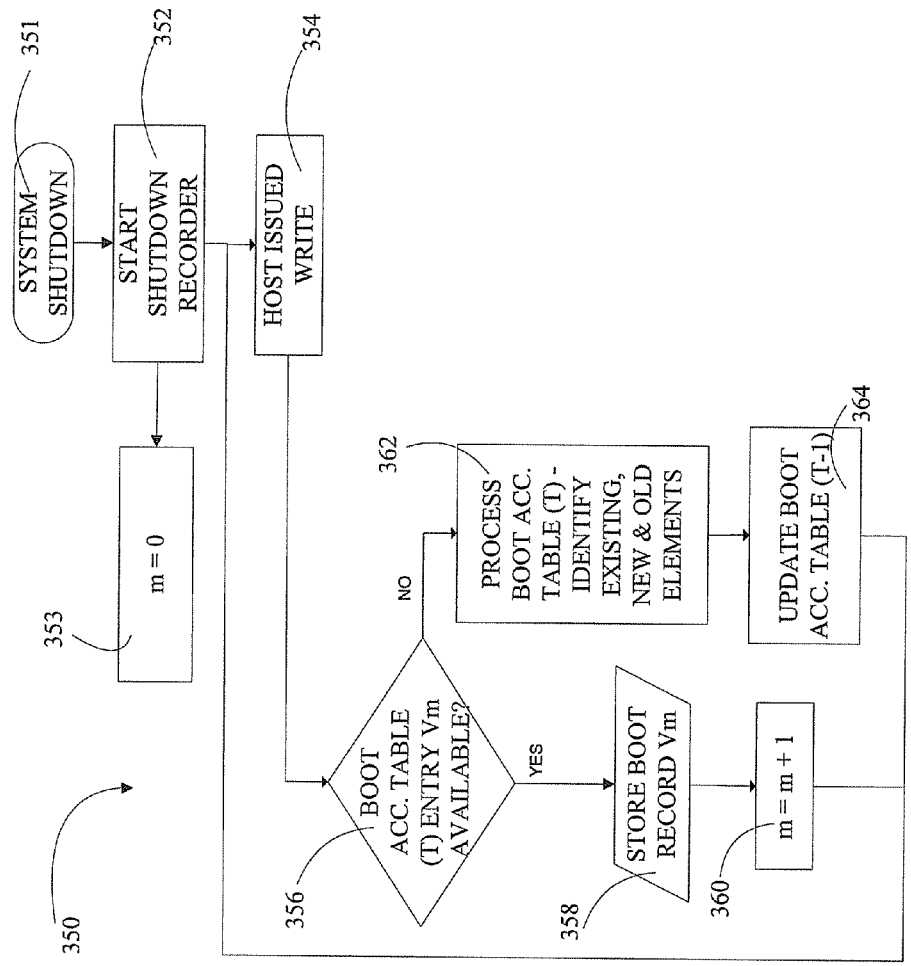
FIG. 3A illustrates a flow diagram of a methodology for recording write operations in a shutdown process, in accordance with an aspect of the current innovation.

Turning to FIG. 3A, illustrated is an optional methodology 350 for recording write transactions associated with a shutdown process, according to aspects of the present innovation. At Event 351, the system initiates a shutdown. At Event 352, the shutdown recorder (107) is started to begin recording all of the write transactions occurring within the boot-up process. At Event 353, the counter associated with the shutdown recorder onsets the initial counter to zero to indicate that shutdown recording session is initiating.

At Event 354, the shutdown process issues a write transaction to begin the process of writing data during the shutdown process. The write transaction will trigger the recording of the write transaction in the boot acceleration table (108).

In terms of recording the write transaction, at Decision Block 356, a determination is made as to whether an entry is available in the boot acceleration table (108). If it is determined that space is available, at Event 358, the entry for the transaction is written into the boot acceleration table (108), typically in the form of a transaction vector that may include the system address/location and the transfer length of the requested data. Once the data is written into the boot acceleration table (108), at Event 360, an index counter is incremented to indicate that an entry has been recorded in the table and the process returns to Event 354, where the next write transaction associated with shutdown process ensues.

If, at Event 356, a determination is made that no location/entry is available in the boot acceleration table (108), at Event 362, the boot acceleration table logic (112) is processed to identify an entry/transaction vector (110) in the table suitable for deletion. An entry/transaction vector (110) suitable for deletion may include a duplicate entry associated with one specific write transaction, an entry associated with a write transaction that is no longer occurring in the shutdown process, an entry associated with an infrequently occurring write transaction or the like. In this regard, the boot acceleration table logic (112) is able to dynamically adapt to the current state of the shutdown process and identify those write transactions in the shutdown process that are still relevant and, thus, require pre-fetching of the transaction data associated with the system address/location. Once the boot acceleration table logic (112) has logically determined a suitable entry for deletion, at Event 364, the entry is cleared from the boot acceleration table (108) and the new entry/transaction vector (110) associated with the current write transaction is entered into the boot acceleration table (108). The updating of the boot acceleration table (108) signifies the completion of the recording process and the process will return to Event 354, where the next write transaction associated with shutdown process ensues.

Figure 4:
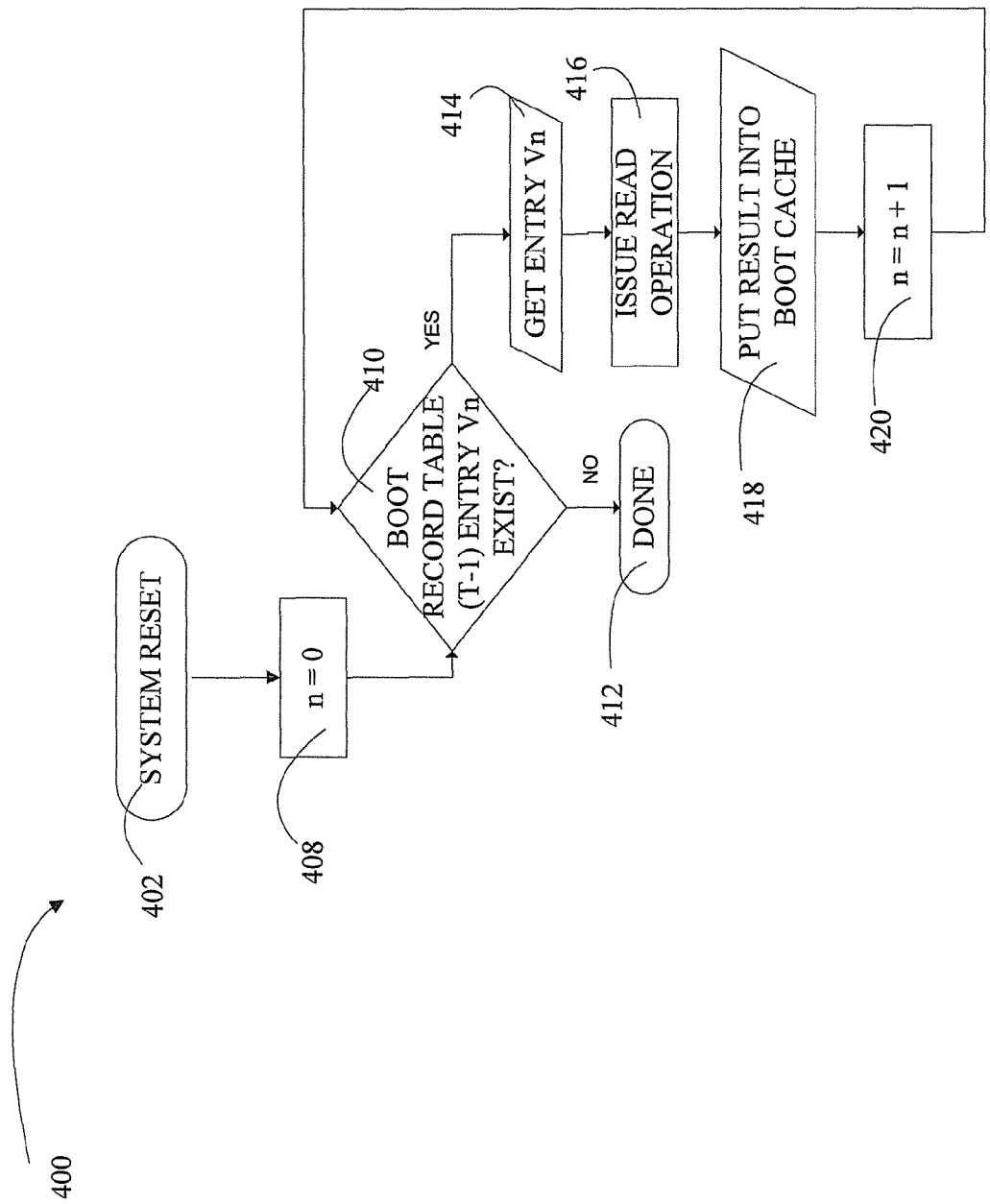
FIG. 4 illustrates a flow diagram of a methodology for pre-fetching information related to previous boot-up read transactions and in some aspects shutdown write transactions, and providing the information to a boot cache, in accordance with an aspect of the present innovation.

Turning attention to FIG. 4, illustrated is a methodology 400 for pre-fetching transaction data (116) associated with previous boot processes and, in some aspects, previous shutdown processes and forwarding the transaction data (116) to the boot cache (120). According to the illustrated aspect, the pre-fetch will sequentially increment through each transaction vector (110) in the boot acceleration table to pre-fetch all of transaction data (116). At Event 402, the computing system powers-up or otherwise resets to initiate the boot-up process. At Event 408, the pre-fetch module (114) sets the initial index counter to zero to indicate that the pre-fetch process is initiating.

At Decision Block 410, the pre-fetch module (114) looks at the first entry in the boot acceleration table at the provided index (108) to determine if a transaction vector (110) exists in the entry. If no transaction vector (110) exists in the entry, the pre-fetch module assumes that no more entries exist in the boot acceleration table and, at Event 412, the pre-fetch process is completed. If a transaction vector (110) does exist in the entry, at Event 414, the pertinent vector information, such as the system address/location and the transfer length of the requested data, is extracted from the entry and at Event 416, the pre-fetch module issues a read command to retrieve the transaction data (116) associated with the transaction vector. Once the transaction data (116) has been accessed and retrieved, at Event 418, the transaction data is communicated to the boot cache (120) for subsequent use by the boot loader (104) in undertaking the current boot process. Once the transaction data has been communicated to the boot cache (120), the pre-fetch module increments the index counter to indicate that the entry in the boot acceleration table (108) has been processed, i.e., pre-fetched, and the process returns to Decision Block 410 to determine if the next entry in the boot acceleration table (108) has a valid transaction vector (110) in the entry.

Figure 5:
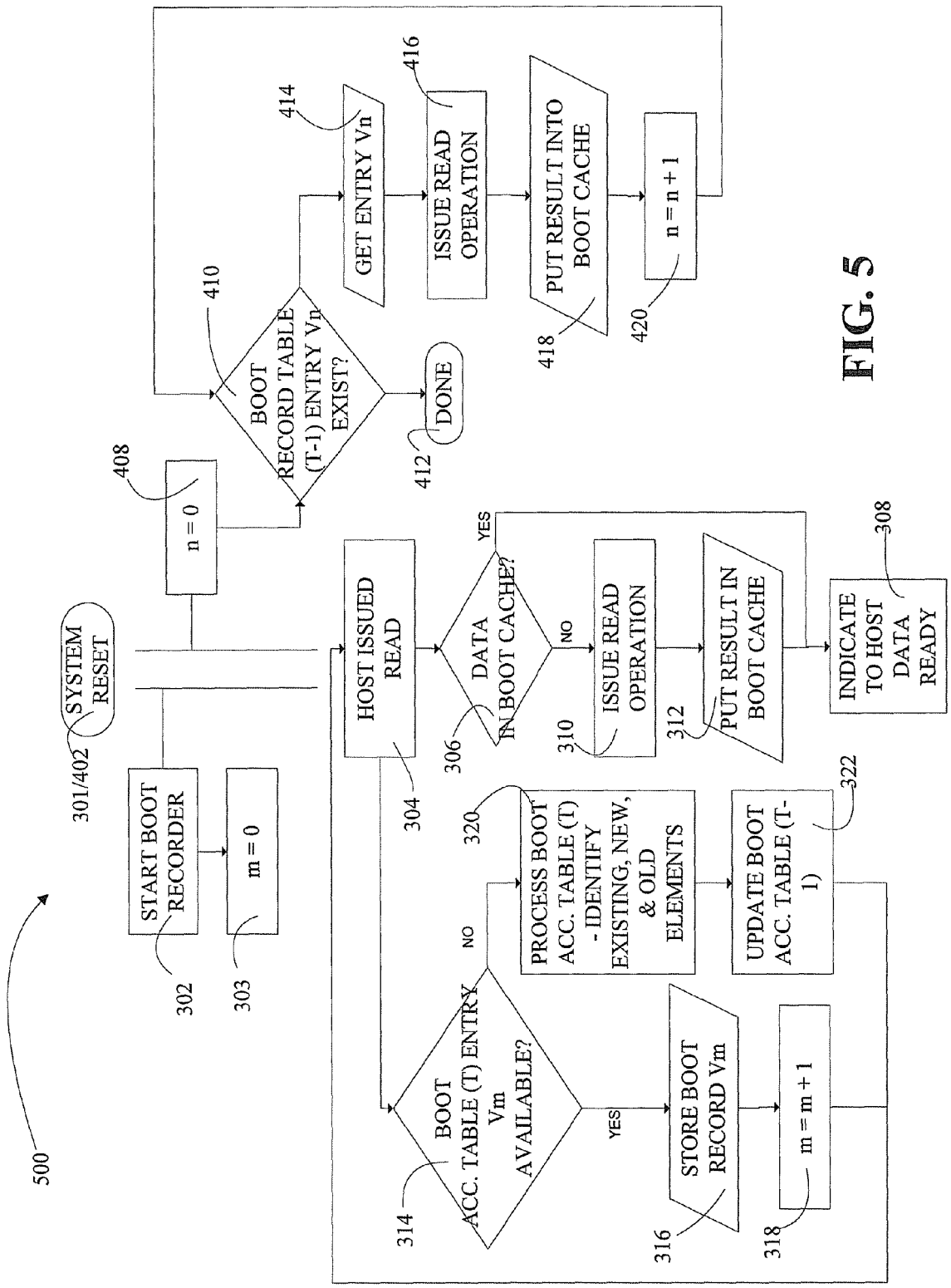
FIG. 5 illustrates a flow diagram of a methodology for conducting in parallel the pre-fetch operation as detailed in FIG. 5 and the boot-up process and the recording of boot-process read transactions as detailed in FIG. 4, in accordance with a present aspect of the innovation.

FIG. 5 illustrates the parallel processing methodology 500 of the boot-up process, boot recording process and pre-fetch processing, according to aspect of the present innovation. The methodology depicted in FIG. 5 is the composite methodology shown and described in relation to FIGS. 3 and 4. Therefore, a detailed discussion of the methodology shown in FIG. 5 is omitted for the sake of avoiding redundancy. As previous noted, the pre-fetch process will be initiated at the onset of the boot-up process and will occur in parallel with the boot transaction recording processing and the boot-up operation. As transaction data (116) is retrieved by the pre-fetch process (Blocks 408-420), the transaction data is communicated to the boot cache (120), where at Decision Block 306, it is determined if pre-fetched transaction data (116) exists for the current issued read transaction. It should noted that while the intent is for the pre-fetch module to pre-fetch transaction data (116) prior to the related read transaction occurring during the boot-up process, in some instances the pre-fetch processing may lag behind the boot processing and, as such, the boot loader will be required to issue the necessary read transactions to retrieve the transaction data as opposed to relying on the pre-fetched transaction data (116).

Figure 6:
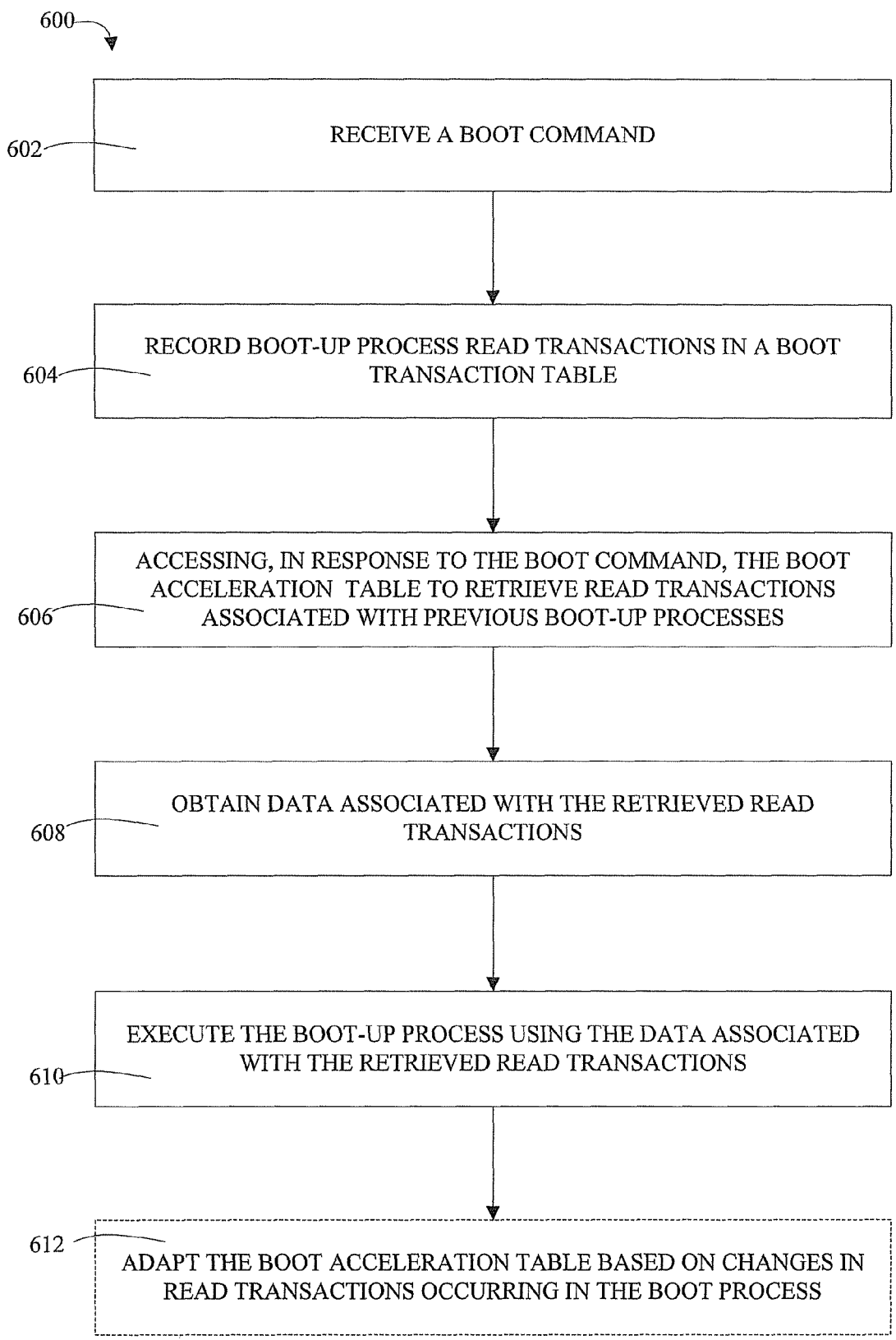
FIG. 6 illustrates a flow diagram of a methodology for boot-up acceleration, in accordance with an aspect of the present invention.

FIG. 6 is a flow diagram of a methodology 600 for adaptive boot-up process acceleration based on previously recorded boot read transactions, in accordance with aspects of the present innovation. At Event 602, the computing system receives a boot command, such as a power-on or a reset that dictates the need to initiate the boot process and load the operating system onto the volatile memory of the system.

In response to the boot command, at Event 604, boot-up process read transactions are recorded in a boot acceleration table. The adaptive nature of this method provides for the read transactions to be recorded iteratively for each boot process and for deltas to be determined between read transactions occurring in the boot-up process and read transactions stored in the table. Deltas between the read transactions occurring in the boot-up and read transactions in the table will dictate an update or change to the table, so that the table reflects actions occurring in the most recent boot-up process. In addition, in response to the boot command, at Event 606, the boot acceleration table is accessed to retrieve read transactions associated with previous boot-up processes. In one aspect, retrieving the read transactions may include accessing each entry in the boot acceleration table to determine the transaction vector associated with the entry. The transaction vector may define the system address/location and the transfer length of the data associated with the location.

At Event 608, the data associated with the retrieved read transactions is obtained. In this regard, read commands are issued based on the transaction vector information to obtain the data associated with the transaction. At Event 610, the boot-up process is executed using the data associated with the retrieved read transactions. Once the data associated with the transactions is retrieved it is communicated to a boot cache, which is accessed by the boot loader during the boot operation and is used in lieu of issuing read commands to retrieve the data from computing system data stores.

At optional event 612, the boot acceleration table is dynamically adapted based on changes in the read transactions occurring in the boot-up process. In this regard, the boot recorder may be configured with logic to determine changes in the boot process, determine read transactions that no longer occur or occur with limited frequency and the like.

Figure 7:
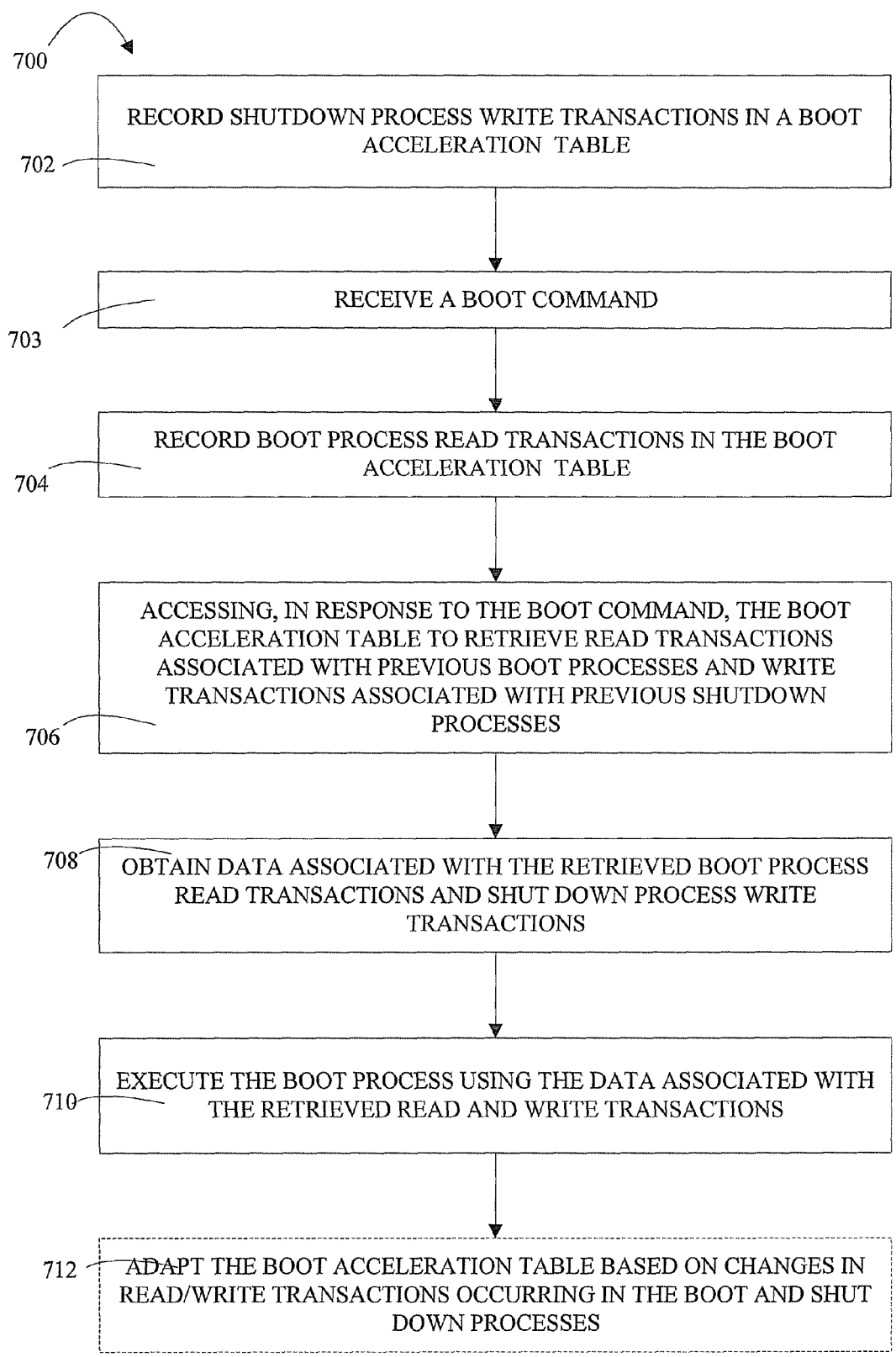
FIG. 7 illustrates a flow diagram of a methodology for boot-up acceleration using shutdown transaction recording, in accordance with an aspect of the subject matter herein disclosed.

FIG. 7 is a flow diagram of a methodology 700 for adaptive boot acceleration based on previously recorded boot read transactions and previously recorded shutdown process write transactions, in accordance with aspects of the present innovation. At Event 702, shutdown process write transactions are recorded in a boot acceleration table and Event 703, the computing system receives a boot command, such as a power-on or a reset that dictates the need to initiate the boot process and load the operating system onto the volatile memory of the system.

In response to the boot command, at Event 704, boot process read transactions are recorded in the boot acceleration table. The adaptive nature of this method provides for the boot read transactions and shutdown write transactions to be recorded iteratively for each boot and shutdown process and for deltas to be determined between read/write transactions occurring in the boot process and shutdown process and read/write transactions stored in the table. Deltas between the read/write transactions occurring in the boot process and shutdown process and read/write transactions in the table will dictate an update or change to the table, so that the table reflects actions occurring in the most recent boot and shutdown process. In addition to the response to the boot command, at Event 706, the boot acceleration table is accessed to retrieve read transactions associated with previous boot processes and write transactions associated with previous shutdown processes. In one aspect, retrieving the read/write transactions may include accessing each entry in the boot acceleration table to determine the transaction vector associated with the entry. The transaction vector may define the system address/location and the transfer length of the data associated with the location.

At Event 708, the data associated with the retrieved read/write transactions is obtained. In this regard, read commands are issued based on the transaction vector information to obtain the data associated with the transaction. At event 710, the boot process is executed using the data associated with the retrieved read/write transactions.

At optional event 712, the boot acceleration table is dynamically adapted based on changes in the read transactions occurring in the boot process and/or write transaction occurring in the shutdown process. In this regard, the boot recorder and/or shutdown recorder may be configured with logic to determine changes in the boot/shutdown process, determine read/write transactions that no longer occur or occur with limited frequency and the like.

It is to be appreciated and understood that the subject innovation is not limited by the acts illustrated and/or by the order of acts, as, for example, acts can occur in various orders and/or concurrently, and with other acts not presented and described herein. In one aspect, the memory component and the at least one other memory component can operate in parallel and/or an interleaved manner to service their respective subset of commands, such that each memory component can service its respective subset of commands at the same or substantially the same time as the other memory component (s) services its respective subset of commands to facilitate improved data access and retrieval.

In accordance with one embodiment, the data transfers can be de-centralized, such that each memory component can contain its own transfer buffer component, which can receive and store data associated with its subset of commands. Each memory component can provide the data stored in its transfer buffer component when all commands in its queue have been serviced. The data can be received from the memory components by the transfer controller component, and the transfer controller component can place the received data in its proper order in its transfer buffer component based in part on the transfer map. The transfer controller component can then transmit the data to the processor component.

The subject innovation can facilitate improved memory access and data retrieval, as compared to conventional systems, as each memory component can service data requests (e.g., commands in its queue) independent of the other memory components and/or can facilitate transferring the data to the transfer controller component, even when another memory component(s) has not finished servicing any or all of its respective subset of commands. At this point, methodology 700 can end.

Figure 8:
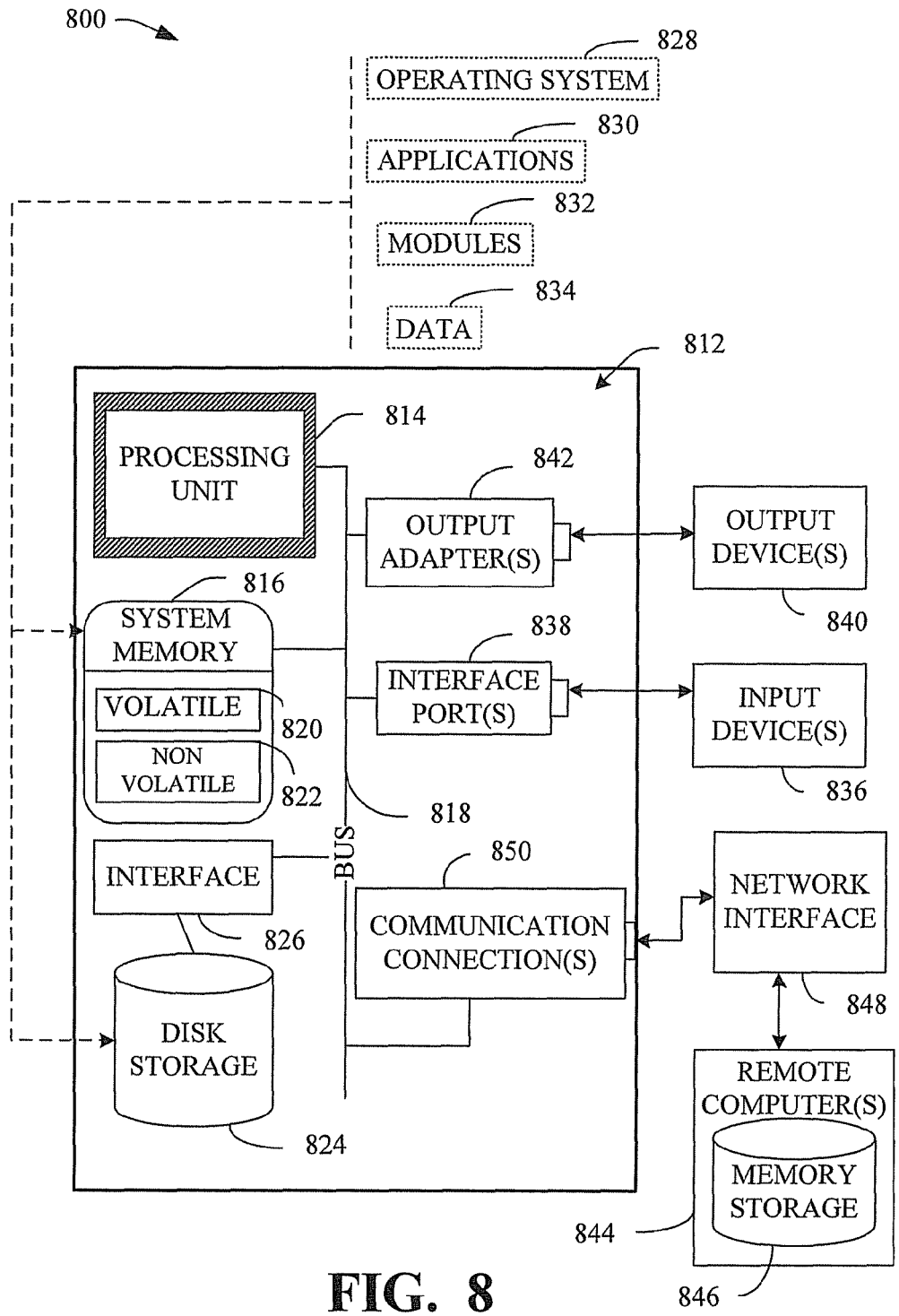
FIG. 8 illustrates a schematic block diagram illustrating a suitable computing operating environment, in accordance with an aspect of the present innovation.

With reference to FIG. 8, a suitable environment 800 for implementing various aspects of the claimed subject matter includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. In addition, according to present innovations, the boot-up transaction table and the shutdown transaction table (not shown in FIG. 8) may be stored in the nonvolatile memory 822. By way of illustration, and not limitation, nonvolatile memory 822 can include read only memory (ROM), programmable ROM (PROM), electrically programmable ROM (EPROM), electrically erasable programmable ROM (EEPROM), or flash memory. According to present aspects, the non-volatile memory may store the boot/shutdown transaction recorder module, the pre-fetch module and the boot-up/shutdown cache (not shown in FIG. 8) and the like. Volatile memory 820 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 812 may also include removable/non-removable, volatile/non-volatile computer storage media. FIG. 8 illustrates, for example, a disk storage 824. Disk storage 824 includes, but is not limited to, devices like a magnetic disk drive, solid state drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used, such as interface 826.

It is to be appreciated that FIG. 8 describes software that acts as an intermediary between users and the basic computer resources described in the suitable operating environment 800. Such software includes an operating system 828. Operating system 828, which can be stored on disk storage 824, acts to control and allocate resources of the computer system 812. System applications 830 take advantage of the management of resources by operating system 828 through program modules 832, such as the boot/shutdown transaction recorder module, the pre-fetch module and the like, and program data 834, such as the boot/shutdown transaction table and the like, stored either in system memory 816 or on disk storage 824. It is to be appreciated that the claimed subject matter can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface polt(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

Figure 9:
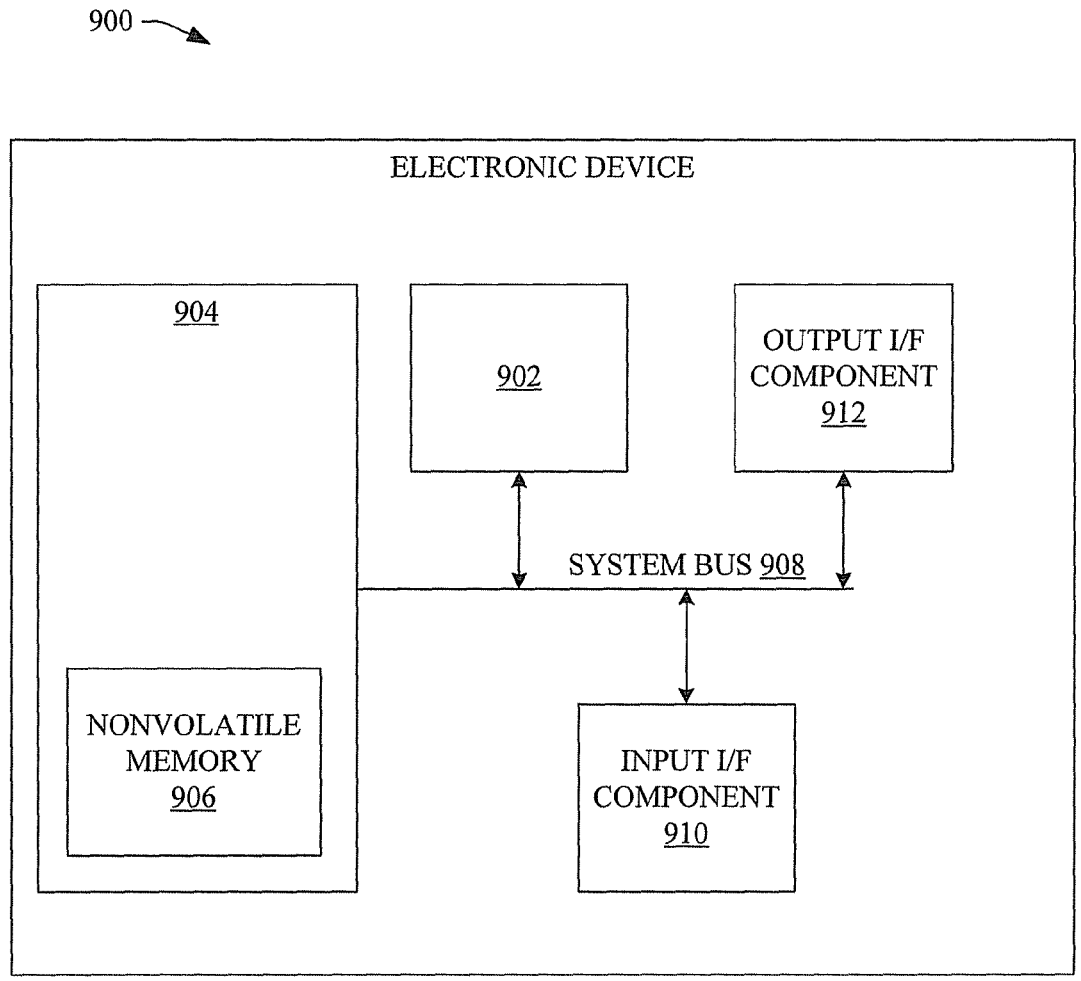
FIG. 9 illustrates an example of an electronic device that can be associated with a memory, in accordance with an aspect of the disclosed subject matter.

Referring to FIG. 9, illustrated is a block diagram of an exemplary, non-limiting electronic device 900 that can comprise and/or incorporate the boot-up and/or shutdown acceleration mechanism of the present invention or a respective portion(s) thereof. The electronic device 900 can include, but is not limited to, a computer, a laptop computer, network equipment (e.g., routers, access points), a media player and/or recorder (e.g., audio player and/or recorder, video player and/or recorder), a television, a smart card, a phone, a cellular phone, a smart phone, an electronic organizer, a PDA, a portable email reader, a digital camera, an electronic game (e.g., video game), an electronic device associated with digital rights management, a Personal Computer Memory Card International Association (PCMCIA) card, a trusted platform module (TPM), a Hardware Security Module (HSM), a set-top box, a digital video recorder, a gaming console, a navigation system or device (e.g., global position satellite (GPS) system), a secure memory device with computational capabilities, a device with a tamper-resistant chip(s), an electronic device associated with an industrial control system, an embedded computer in a machine (e.g., an airplane, a copier, a motor vehicle, a microwave oven), and the like.

Components of the electronic device 900 can include, but are not limited to, a processor component 902, a system memory 904, which can contain a nonvolatile memory 906, and a system bus 908 that can couple various system components including the system memory 904 to the processor component 902. The system bus 908 can be any of several types of bus structures including a memory bus or memory controller, a peripheral bus, or a local bus using any of a variety of bus architectures.

Electronic device 900 can typically include a variety of computer readable media. Computer readable media can be any available media that can be accessed by the electronic device 900. By way of example, and not limitation, computer readable media can comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, nonvolatile memory 906 (e.g., flash memory), or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by electronic device 900. Communication media typically embodies computer readable instructions, data structures, program modules or other data in a modulated data signal such as a carrier wave or other transport mechanism and includes any information delivery media.

The system memory 904 can include computer storage media in the form of volatile (e.g., SRAM) and/or nonvolatile memory 906 (e.g., flash memory). For example, nonvolatile memory 906 can comprise one or more memory components that can be the same or similar, or can contain the same or similar functionality, as memory components as described with regard to system 100, system 200, etc.). A basic input/output system (BIOS), containing the basic routines that can facilitate transferring information between elements within electronic device 900, such as during start-up, can be stored in the system memory 904. The system memory 904 typically also can include data and/or program modules that can be accessible to and/or presently be operated on by the processor component 902. By way of example, and not limitation, the system memory 904 can also include an operating system(s), application programs, other program modules, and program data.

The nonvolatile memory 906 can be removable or non-removable. For example, the nonvolatile memory 906 can be in the form of a removable memory card or a USB flash drive. In accordance with one aspect, the nonvolatile memory 906 can include flash memory (e.g., single level cell flash memory, multi level cell flash memory), ROM, PROM, EPROM, EEPROM, or NVRAM (e.g., FeRAM), or a combination thereof, for example. Further, a flash memory can comprise NOR flash memory and/or NAND flash memory. For purposes of the present innovations, the nonvolatile memory 906 may store the boot acceleration table 108 and the shutdown transaction table 208 (not shown in FIG. 9).

A user can enter commands and information into the electronic device 900 through input devices (not shown) such as a keypad, microphone, tablet, or touch screen although other input devices can also be utilized. These and other input devices can be connected to the processor component 902 through input interface component 910 that can be connected to the system bus 908. Other interface and bus structures, such as a parallel port, game port or a universal serial bus (USB) can also be utilized. A graphics subsystem (not shown) can also be connected to the system bus 908. A display device (not shown) can be also connected to the system bus 908 via an interface, such as output interface component 912, which can in turn communicate with video memory. In addition to a display, the electronic device 900 can also include other peripheral output devices such as speakers (not shown), which can be connected through output interface component 912.

It is to be understood and appreciated that the computer-implemented programs and software can be implemented within a standard computer architecture. While some aspects of the disclosure have been described above in the general context of computer-executable instructions that can be run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone), microprocessor-based or programmable consumer electronics, and the like, each of which can be operatively coupled to one or more associated devices.

The illustrated aspects of the disclosure may also be practiced in distributed computing environments where certain tasks are performed by remote processing devices that are linked through a communications network. In a distributed computing environment, program modules can be located in both local and remote memory storage devices.

It is also to be understood and appreciated that cryptographic protocols can be employed to facilitate security of data associated with a memory in accordance with the disclosed subject matter. For example, a cryptographic component (e.g., cryptographic engine) can be employed and can facilitate encrypting and/or decrypting data to facilitate securing data being written to, stored in, and/or read from the memory. The cryptographic component can provide symmetric cryptographic tools and accelerators (e.g., Twofish, Blowfish, AES, TDES, IDEA, CAST5, RC4, etc.) to ensure that a specified partition in the memory component, or portions thereof, can only be accessed by those entities authorized and/or authenticated to do so. The cryptographic component can also provide asymmetric cryptographic accelerators and tools (e.g., RSA, Digital Signature Standard (DSS), and the like) to ensure that a specified partition in a memory, or portions thereof, only can be accessed by those entities that are authorized and certified to do so. Additionally, the cryptographic component can provide accelerators and tools (e.g., Secure Hash Algorithm (SHA) and its variants such as, for example, SHA-0, SHA-1, SHA-224, SHA-256, SHA-384, and SHA-512) to ensure that access to the specified partition in the memory is confined to those entities authorized to gain access.

It is to be appreciated and understood that authentication protocols can be employed to facilitate security of data associated with the memory in accordance with the disclosed subject matter. For example, an authentication component can solicit authentication data from an entity, and, upon the authentication data so solicited, can be employed, individually and/or in conjunction with information acquired and ascertained as a result of biometric modalities employed, to facilitate control access to the memory. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), and the like, for example. Additionally and/or alternatively, public key infrastructure (PKI) data can also be employed by the authentication component. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

The authentication component can implement one or more machine-implemented techniques to identify an entity by its unique physical and behavioral characteristics and attributes. Biometric modalities that can be employed can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an entity's iris, and finger print identification that scans the corrugated ridges of skin that are non-continuous and form a pattern that can provide distinguishing features to identify an entity.

As utilized herein, terms "component," "system," "interface," and the like, are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

As such, the present innovation provides an acceleration mechanism for boot-up processing in a computing system. The present innovation relies on recording most, and in some aspects all, of the read transactions, in terms of system locations/address and transfer lengths, associated with requests and retrievals made during a boot-up and, in some aspects, most, and in some aspects, all of write transactions, in the terms of system locations/address and transfer lengths, associated with requests and stores made during a shutdown process. Prior to executing the boot-up process, the recorded transactions are determined, information related to the recorded transactions is pre-fetched and used in lieu of waiting for the computing system to initiate the requests or information retrievals for the current boot-up process. Additionally, since the mechanism of the present innovation provides for continual recording of the transaction data and determinations of infrequently used transactions, the acceleration of the boot-up process can be dynamic and adaptive to change in the event of hardware additions/changes to the system or any other changes that affect the boot-up or shutdown process occur.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system for accelerating a boot-up process in a computing system, comprising:
 a boot loader operable for loading an operating system;
 a boot transaction recorder operable to record boot-up processing read transactions that occur during execution of the boot loader and maintain the transactions in a boot acceleration table;
 a pre-fetch module operable for access the boot acceleration table to retrieve read transactions associated with previous boot-up processes;
 a boot cache operable to receive data associated with the retrieved read transactions from the pre-fetch module,
 wherein the boot loader is further operable to execute one or more read transactions using the data associated with the retrieved read transactions in the boot cache; and
 boot transaction logic operable to determine whether a specified read transaction, of a plurality of read transactions in the boot acceleration table, occurs infrequently in the boot-process, and delete the specified read transaction from the boot acceleration table when boot transaction logic determines that the specified read transaction occurs infrequently in the boot process, wherein the specified read transaction is determined to occur infrequently when the specified read transaction has at least one of not occurred within a predetermined period of time or not occurred within a predetermined number of boot-up processes.

2. The system of claim 1, further comprising a shutdown transaction recorder operable to record shutdown processing write transactions that occur during shutdown and maintain the transactions in the boot acceleration table.

3. The system of claim 2, wherein the pre-fetch module is further operable to access the boot acceleration table to retrieve read transactions associated with previous boot-up processes and write transactions associated with previous shutdown processes.

4. The system of claim 3, wherein the boot cache is further operable to receive data associated with the retrieved read transactions and the retrieved write transactions from the pre-fetch module and wherein the boot loader executes one or more read transactions using the data associated with the retrieved read transactions and retrieved write transactions in the boot cache.

5. The system of claim 1, wherein the boot transaction recorder is further operable to iteratively update the boot acceleration table based at least in part on occurrence of boot-up processing read transactions for each boot-up process.

6. The system of claim 1, further comprising boot acceleration table logic operable to determine which boot-up processing read transactions to include in the boot acceleration table based at least in part on a comparison between read transactions currently existing in the boot acceleration table and read transactions occurring in a current boot-up process.

7. The system of claim 1, wherein the boot transaction logic is further operable to prioritize read transactions relative to each other and in terms of the boot-up process such that a read transaction that occurs in all boot-up processes is given a higher priority than another read transaction that does not occur in all boot-up processes during pre-fetch of read transactions in the boot-up process.

8. The system of claim 1, wherein the boot-transaction table is further operable to store a system address and a transfer length related to boot-up processing read transactions.

9. An electronic device comprising the system of claim 1.

10. The electronic device of claim 9, the electronic device is one of a computer, a cellular phone, a digital phone, a video device, a smart card, a personal digital assistant, a television, an electronic game, a digital camera, an electronic organizer, an audio player, an audio recorder, an electronic device associated with digital rights management, a Personal Computer Memory Card International Association (PCMCIA) card, a trusted platform module (TPM), an electronic control unit associated with a motor vehicle, a global positioning satellite (GPS) device, an electronic device associated with an airplane, an electronic device associated with an industrial control system, a Hardware Security Module (HSM), a set-top box, a secure memory device with computational capabilities, or an electronic device with at least one tamper-resistant chip.

11. A method for accelerating a boot-up process in a computing system, comprising:
 recording boot-up processing read transactions in a boot acceleration table;
 receiving a boot-up command;
 accessing, in response to the boot-up command, the boot acceleration table to retrieve read transactions associated with previous boot-up processes;
 obtaining data associated with the retrieved read transactions;
 executing the boot-up process using the data associated with the retrieved read transactions;
 determining whether at least one particular read transaction, of a plurality of read transactions in the boot acceleration table, occurs infrequently in the boot-process, wherein the at least one particular read transaction is determined to occur infrequently in boot-up processes when the at least one particular read transaction has at least one of not occurred within a predetermined period of time or not occurred within a predetermined number of boot-up processes; and
 deleting the at least one particular read transaction from the boot acceleration table based at least in part to the at least one particular read transaction being determined to occur infrequently.

12. The method of claim 11, further comprising recording shutdown processing write transactions in the boot acceleration table.

13. The method of claim 12, wherein the accessing, further comprises accessing, in response to the boot-up command, the boot acceleration table to retrieve read transactions associated with previous boot-up processes and write transactions associated with previous shutdown processes.

14. The method of claim 13, wherein the obtaining further comprises obtaining data associated with the retrieved read transactions and the retrieved write operations and wherein executing further comprises executing the boot-up process using the data associated with the retrieved read transactions and retrieved write transactions.

15. The method of claim 11, wherein the recording boot-up processing read transactions further comprises iteratively updating the boot acceleration table based at least in part on the occurrence of boot-up processing read transactions for each boot-up process.

16. The method of claim 11, further comprising determining which boot-up processing read transactions to include in the boot acceleration table based at least in part on a comparison between read transactions currently existing in the boot translation table and read transactions occurring in a current boot-up process.

17. The method of claim 11, further comprising:
prioritizing read transactions in terms of the boot-up process such that a read transaction that occurs in all boot-up processes is given a higher priority than another read transaction that does not occur in all boot-up processes during pre-fetch of read transactions in the boot-up process.

18. The method of claim 11, wherein the recording boot-up processing read transactions further comprises recording a system address and a transfer length related to boot-up processing read transactions.

19. The method of claim 11, wherein the obtaining data associated with the retrieved read transactions further comprises:
reading data associated with the retrieved read transactions; and
transferring the data to a boot-up process cache.

20. The method of claim 11, wherein the executing one or more read transactions associated with a boot-up process further comprises determining if data associated with the retrieved read transactions resides in a boot-up process cache.

* * * * *